United States Patent [19]
Slager

[11] Patent Number: 5,671,828
[45] Date of Patent: Sep. 30, 1997

[54] TRANSMISSION BAND ASSEMBLY

[75] Inventor: Douglas J. Slager, Wheaton, Ill.

[73] Assignee: Borg-Warner Automotive, Inc., Sterling Heights, Mich.

[21] Appl. No.: 598,315

[22] Filed: Feb. 8, 1996

[51] Int. Cl.$^6$ .................................................. F16D 49/08
[52] U.S. Cl. .................. 188/77 W; 188/259; 192/107 T
[58] Field of Search ............................. 188/77 W, 77 R, 188/249, 250 H, 259; 192/80, 107 T

[56] References Cited

U.S. PATENT DOCUMENTS 5,346,040  9/1994  Puchalla et al. .................... 188/77 W

*Primary Examiner*—Peter M. Poon
*Attorney, Agent, or Firm*—Emch, Schaffer et al.; Greg Dziegielewski

[57] ABSTRACT

A transmission band assembly including a circular strap member having exterior and interior surfaces extending between opposed first and second ends. At least one of the ends defining a bracket having a ridge including an upper gusset in mating engagement with a lower gusset. A friction material liner is positioned adjacent the interior surface of the strap member. The upper and lower gussets provide reinforcement of the ridge.

8 Claims, 3 Drawing Sheets

TRANSMISSION BAND ASSEMBLY

BACKGROUND OF THE INVENTION

The present invention relates to a transmission band assembly. More specifically, the invention is directed to a transmission band assembly having at least one bracket that includes a ridge reinforced by an upper gusset and a lower gusset.

Transmission bands are used to act as a brake or clutch to stop a rotating drum member of a transmission. The interior circumference of a transmission band is usually lined with a friction material to assist in achieving the smooth cessation of drum rotation. The ends of a transmission band generally have brackets or lugs known as apply and reaction members that are used to anchor the band member and apply pin members located within the transmission. The reaction member is usually anchored and the apply pin engages the apply member to push the apply member toward the reaction member, thereby decreasing the circumference of the band and causing the band to frictionally engage the rotating members or drums within the transmission to brake those members to a stop.

An example of a transmission band is found in U.S. Pat. No. 5,346,040, the subject matter of which is incorporated herein by reference. The transmission band disclosed in the '040 patent includes two brackets, i.e., apply and reaction members, that each includes a ridge. The ridge is reinforced by a single gusset. The single gusset is opposed to a recess or pocket defined by the ridge that receives the pin located within the transmission. The single gusset provides adequate reinforcement of the ridge. However, if the actuating forces caused by the transmission pins are great, the single gusset can become stressed. This results in a weakening of the ridge of the bracket.

It has been found that there is a need for a transmission band assembly having brackets that can withstand high forces. The present invention satisfies this need by providing, among other things, a transmission band assembly having brackets that include mating upper and lower gussets. This "double gusset" arrangement significantly reduces stress in the upper gusset because the lower gusset carries part of the load caused by the actuating force of the apply pin.

SUMMARY OF THE INVENTION

The present invention is directed to a transmission band assembly including a substantially circular strap member having exterior and interior surfaces extending between opposed first and second ends. At least one of the ends defines a bracket having a ridge including an upper gusset in mating engagement with a lower gusset. A friction liner is positioned adjacent the interior surface of the strap member.

It is the primary object of the present invention to provide a superior transmission band assembly having a bracket that includes a ridge reinforced by an upper gusset in mating engagement with a lower gusset.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
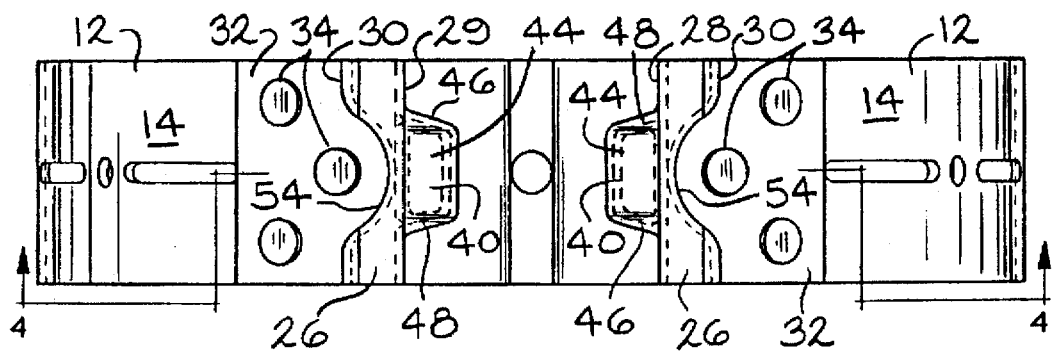
FIG. 1 is a top plan view of the opposed first and second ends of the circular strap member according to the present invention.

The preferred embodiments and best mode of the present invention will now be described in detail with reference being made to the drawings. The transmission band assembly according to the present invention will be generally indicated in the drawings by the reference number "10".

Referring to FIGS. 1 through 4, the transmission band assembly 10 includes a substantially circular strap member 12 having an exterior surface 14 and an interior surface 16. The strap member 12 extends between a first end 18 and an opposed second end 20. The strap member 12 can be made from a variety of materials, with metal being preferred.

Still referring to FIGS. 1 through 4, the first and second ends 18 and 20 each defines a bracket. In the present embodiment, the first end 18 defines a bracket or apply member 22. The second end 20 defines a bracket or reaction member 24. In the present embodiment, the apply member 22 has substantially the same form as the reaction member 24. It should be understood however that the members 22 and 24 can include a variety of forms depending on the application of the assembly 10.

Figure 3:
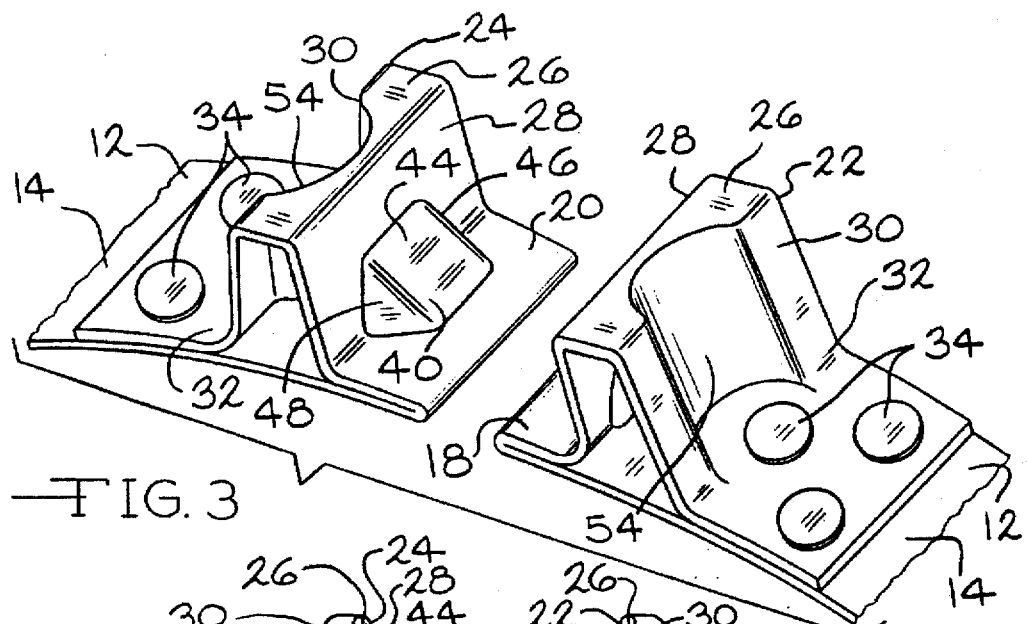
FIG. 3 is a perspective view of the opposed first and second ends of the circular strap member according to the present invention.
Figure 4:
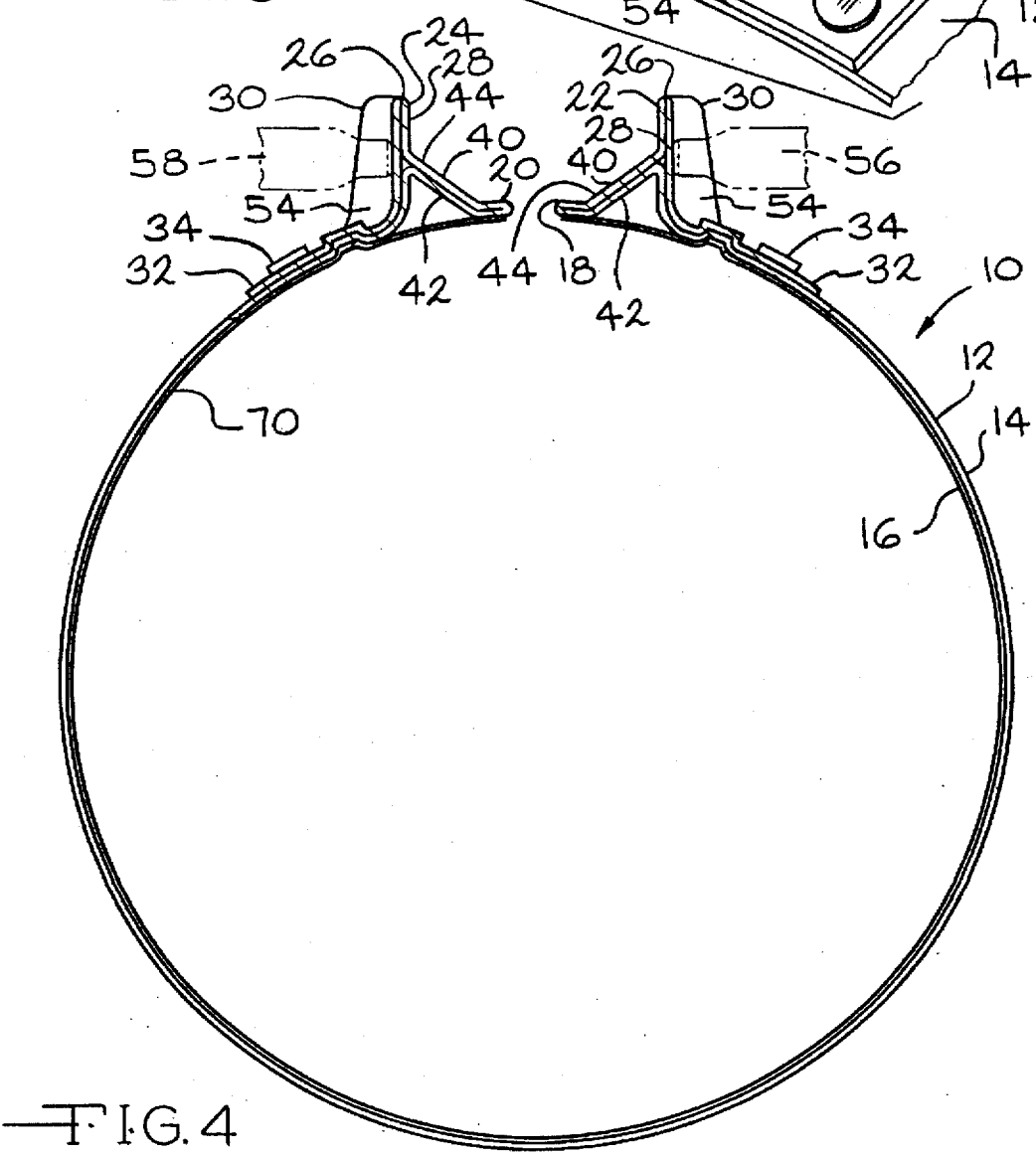
FIG. 4 is a cross sectional view taken through line 4—4 of FIG. 1.
Figure 5:
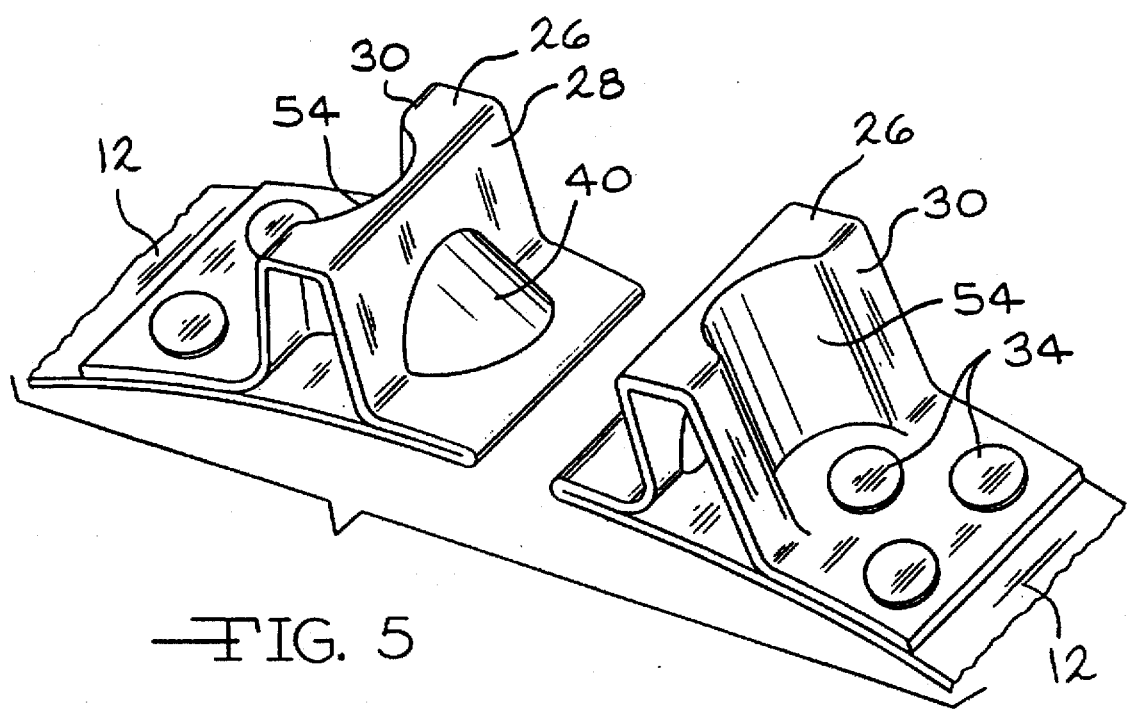
FIG. 5 is a perspective view of an alternative embodiment of the opposed first and second ends according to the present invention.

Referring to FIGS. 3 and 4, each of the members 22 and 24 includes a ridge 26 having a first wall 28 and an opposed second wall 30. As shown in FIG. 4, sections 32 of the strap member 12 are folded at first and second ends 18 and 20 to form the ridges 26. The sections 32 are folded back upon the exterior surface 14 of the strap member 12 where they are fixedly attached. In the present embodiment, the sections 32 are attached to the exterior surface 14 by a plurality of rivets 34. The sections 32 define an upper gusset 40 and a lower gusset 42. The upper and lower gussets 40 and 42 are in mating engagement with one another. The upper and lower gussets 40 and 42 extend from the ends 18 and 20 to the first walls 28 of the ridges 26. As shown in FIGS. 1 and 3, each of the gussets 40 and 42 includes a flat portion 44 positioned between a first wing 46 and a second wing 48. An alternative embodiment is shown in FIG. 5. In this embodiment, the upper and lower gussets 40 and 42 have rounded surfaces.

Referring to FIGS. 1 through 4, each of the ridges 26 defines a recess 54 on the second wall 30. As shown in FIG. 4, the recess 54 receives and guides a pin of a transmission. In the present embodiment, the recess 54 of the apply member 22 receives an apply pin 56. The recess 54 of the reaction member 24 receives an anchor pin 58. It should be understood that the recesses 54 can receive and guide a variety of pins and other objects depending on the application of the assembly 10. As shown in FIGS. 1, 3 and 4, the upper and lower gussets 40 and 42 are positioned on the first walls 28 of the ridges 26 in an opposed relationship with the recesses 54. This allows the gussets 40 and 42 to reinforce the ridges 26 at the points where the ridges receive the actuating forces from the pins 56 and 58.

It has been found that the "double gusset" arrangement formed by the mating engagement of the upper and lower gussets 40 and 42 provides superior reinforcement of a ridge 26. The improved strength is caused by the flat portion 44 which provides a larger area for the actuating force to be opposed. Secondly, the upper and lower gusset arrangement reduces stress in the upper gusset 40 because the lower gusset 42 carries part of the load caused by the actuating force of the transmission pin. It has been found that the present invention is capable of sustaining actuating loads in excess of 800 pounds. The present invention has also been found to provide superior fatigue life as compared to prior transmission band assemblies.

Figure 2:
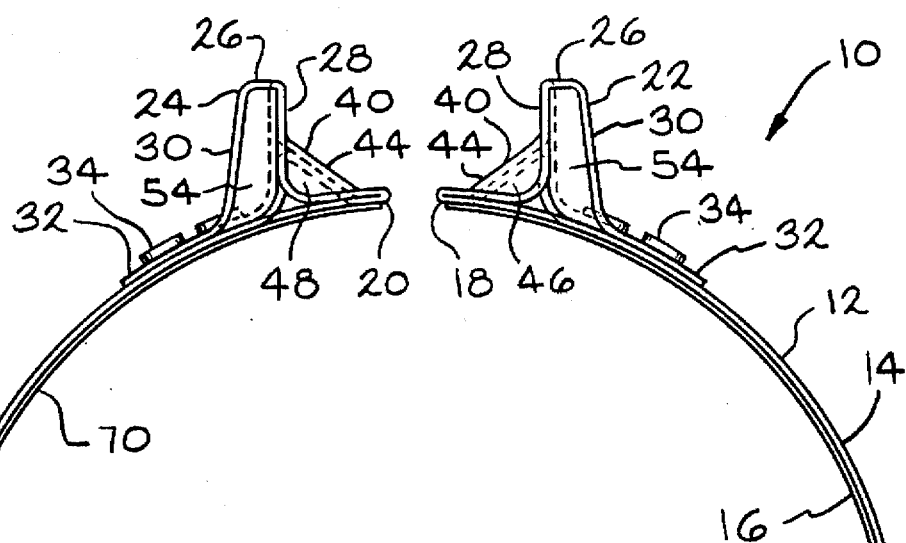
FIG. 2 is a front elevation view of the transmission band assembly of the present invention.

As shown in FIGS. 2 and 4, the transmission band assembly 10 includes a conventional friction material liner 70 adjacent the interior surface 16 of the strap member 12. The liner 70 can be made from a variety of materials, with resin being preferred.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, with the scope of the invention being defined solely by the appended claims.

I claim:

1. A transmission band assembly, comprising:

a substantially circular strap member having exterior and interior surfaces extending between opposed first and second ends;

at least one of said ends defining a bracket including a ridge having a first wall, being folded flat back over and onto itself forming an adjacent surface prior to the formation of said bracket, and an opposed second wall, said first wall including an upper gusset in direct mating engagement with a lower gusset, said second wall defining at least one recess, said upper and lower gussets being positioned on said first wall in an opposed relationship with said recess and at least a portion of said upper and lower gussets being formed directly on and over said adjacent surface; and a friction material liner adjacent said interior surface.

2. The invention of claim 1, wherein said strap member consists of metal.

3. The invention of claim 1, wherein said bracket is an apply member.

4. The invention of claim 1, wherein said bracket is a reaction member.

5. The invention of claim 1, wherein said ridge is formed from a section of said strap member that has been folded at said end.

6. The invention of claim 1, wherein said upper and lower gussets define a flat reinforcing portion.

7. The invention of claim 1, wherein said friction material liner consists of resin.

8. A transmission band assembly, comprising:

a substantially circular strap member having exterior and interior surfaces extending between opposed first and second ends;

an apply member adjacent said exterior surface of said strap member at said first end and a reaction member adjacent said exterior surface of said strap member at said second end, at least one of said first and second ends being folded flat back over and onto itself forming and adjacent surface prior to the formation of at least one of said apply and reaction members, each of said members including a ridge having a first wall and an opposed second wall, each of said first walls including an upper gusset in direct mating engagement with a lower gusset, each of said second walls defining at least one recess, each of said upper and lower gussets being positioned on each of said first walls in an opposed relationship with each of said recesses and at least a portion of said upper and lower gussets being formed directly on and over said adjacent surface; and a friction material liner adjacent said interior surface.

* * * * *